(12) United States Patent
Hentzel et al.

(10) Patent No.: US 8,443,848 B2
(45) Date of Patent: May 21, 2013

(54) PORT SYSTEM FOR FASTENING A CONTAINER TO A CONNECTION SYSTEM

(75) Inventors: Stephane Hentzel, Yvonand (CH); Peter Jaggy, La Tour-de-Peilz (CH); Michiel Kernkamp, Lausanne (CH); Johan Bergdahl, Lausanne (CH); John Meldrum, Orbe (CH)

(73) Assignee: Nestec S.A., Vevey (CH)

( * ) Notice: Subject to any disclaimer, the term of this patent is extended or adjusted under 35 U.S.C. 154(b) by 677 days.

(21) Appl. No.: 12/666,070

(22) PCT Filed: Jun. 26, 2008

(86) PCT No.: PCT/EP2008/058167
§ 371 (c)(1),
(2), (4) Date: Dec. 22, 2009

(87) PCT Pub. No.: WO2009/000887
PCT Pub. Date: Dec. 31, 2008

(65) Prior Publication Data
US 2010/0180773 A1    Jul. 22, 2010

(30) Foreign Application Priority Data

Jun. 28, 2007  (EP) .................................... 07111228
Jun. 28, 2007  (EP) .................................... 07111345

(51) Int. Cl.
*B65D 6/00*   (2006.01)
*B65D 25/16*  (2006.01)
*B65D 25/08*  (2006.01)

(52) U.S. Cl.
USPC ............. 141/18; 141/330; 141/331; 141/364; 222/81; 222/129; 206/222

(58) Field of Classification Search ................ 99/289 R, 99/295; 141/18, 331, 330, 329, 364; 222/81, 222/80, 129, 521; 206/222, 219; 426/106
See application file for complete search history.

(56) References Cited

U.S. PATENT DOCUMENTS

| | | | | |
|---|---|---|---|---|
| 2,767,744 A | * | 10/1956 | Beerman | 141/319 |
| 3,171,449 A | * | 3/1965 | Ellms et al. | 141/330 |
| 4,173,858 A | | 11/1979 | Cassia | |
| 4,834,261 A | * | 5/1989 | Brdlik | 141/332 |
| 5,131,566 A | * | 7/1992 | Bavegems | 222/80 |
| 5,941,380 A | * | 8/1999 | Rothman | 206/222 |

FOREIGN PATENT DOCUMENTS

| | | |
|---|---|---|
| FR | 2489266 | 5/1982 |
| FR | 2647004 A2 | 11/1990 |

OTHER PUBLICATIONS

Written Opinion, PCT/EP2008/058167.
International Search Report, PCT/EP/058167.

\* cited by examiner

*Primary Examiner* — Reginald L Alexander
(74) *Attorney, Agent, or Firm* — K&L Gates LLP

(57) ABSTRACT

The invention concerns a port system (1) for fastening a container (3) comprising a vessel (2) and an outlet (6) to a connection system (14) presenting an inlet, said port system comprising: —a main skirt (4) connectable to the outlet (6) of the container presenting a connecting end and a discharge end (7), —a hopper (8) attached to the internal wall of the skirt and tapering to a discharge outlet (9) in direction of the main skirt discharge end (7), —a tearable membrane (10) closing the skirt discharge end and the hopper.

7 Claims, 4 Drawing Sheets

PORT SYSTEM FOR FASTENING A CONTAINER TO A CONNECTION SYSTEM

The present invention relates to a port system for fastening a container comprising a bulk material to a connection system like the connection system of a machine using this bulk material. More particularly, the invention relates to a port system for a flowable beverage ingredient container usable in beverage dispensers.

Various automated beverage machines for making hot or cold beverage products are known in the art. In a conventional beverage machine, a metered amount of water soluble beverage powder, stored in a powder tank, and a metered amount of hot or cold water, supplied from a water source, is mixed in a mixing chamber to produce a beverage or food, which is then dispensed into a cup and served. The refilling of tanks consists in pouring the powder from a disposable powder bag type package for example gusset bags with zippers that allow the bag to be re-opened and closed. During this operation, the operator encounters several problems.

There can be a significant loss of powder during the transfer of the powder from the refilling bag to the tank to be refilled. As a consequence a certain quantity of powder is lost and there is also a dusting of the coffee machine by the powder that has fallen out of the tank. A periodic cleaning of the machine is therefore necessary to avoid a dirty looking machine as well as to avoid hygiene problems.

Another problem is caused by the mixing of the powder with air when it flows from one container to the other: it can create a problem of hygiene due to possible contamination with the outside environment, especially, when air and water sensitive powders are used. Moreover, air can generally cause a loss of aroma of the transferred coffee powder. Lastly, the dry powder can be a highly hygroscopic material, thereby leading to the formation of lumps and cakes that prevent gravity flow and transport of the powder inside the machine.

There also exist problems relative to the disposable containers used to refill the coffee machine tanks. One problem is due to the fact that the machines are often calibrated so that they provide the best coffee beverage with a specific coffee powder. An error in the type of coffee powder that is refilled in the machine could lead to a reduced quality beverage disappointing the consumer. It would be appreciable to provide containers specifically adapted to a type of machine so as to guarantee an improved beverage dispensing.

Therefore, there is need for a satisfactory container that would allow the refilling of the tank of beverage dispensers with a flowable substance from a convenient removable package with a high level of cleanliness and with limited contact with atmosphere. In particular there does not exist a powder refillable container that can be adapted in a quick, clean and effective manner to a tank or directly in the machine.

The present invention now resolves these deficiencies.

In a first aspect, the invention relates to a port system for fastening a container comprising a vessel and an outlet to a connection system presenting an inlet, said port system comprising:
- a main skirt connectable to the outlet of the container presenting a connecting end and a discharge end,
- a hopper attached to the internal wall of the skirt and tapering to a discharge outlet in direction of the main skirt discharge end,
- a tearable membrane closing the skirt discharge end and the hopper.

The port system of the present invention is a cap like device that is designed to be placed at the outlet of a container. This port system enables simultaneously the closure of the container before it is used for the first time and the fastening of the container to a connection system in a quick, clean and effective manner in order to transfer the material stored in the container to the machine or the tank comprising the connection system. Once the container is fastened to the connection system, the container can stay in place and be used as a tank or its content can be totally emptied in a tank according to the design of the machine comprising the connection system. The port system of the present invention is particularly adapted for a container from which bulk material is intended to be withdrawn by gravity.

The port system of the present invention comprises a main skirt connectable to the outlet of the container. Usually the main skirt presents an annular form, but any other form can be used. For example, it can present a specific form similar to the opening of the inlet of the connection system to be refilled; this specific form can avoid the connection with a container whose product is not adapted for.

The main skirt presents a connecting end in contact with the outlet of the vessel. This connecting end attaches the port system to the container. With his aim the form of the main skirt can be defined so that it fits exactly inside the container outlet or outside and lean on it. The connection can be improved by sticking the main skirt to the vessel outlet. According to another variant, the main skirt can present connecting means for attachment to the outlet of the container, preferably to corresponding connecting means present on the container outlet. These connecting means for attachment to the outlet of the container can be selected between screwing, snapping means and the like. The main skirt connecting means for attachment to the outlet of the container are generally present on a part of the internal periphery of the main skirt. Then, the port system main skirt surrounds the container outlet when it is connected to the container. The connecting means are generally placed at the end of the skirt opposed to the discharge end of the skirt.

In a preferred embodiment the main skirt discharge outlet presents a flange. This flange is helpful for fixing the tearable membrane to the main skirt.

The port system of the present invention comprises a hopper which function is to enable the unloading of the material stored in the container outside of the container. This hopper or funnel-shaped receptacle enables the material to fall by gravity into the connection system at the opened end of the vessel. According to the invention, the hopper is attached to the internal wall of the main skirt either directly or indirectly. It is indirectly attached to the main skirt when it is attached to an intermediate element that is itself attached to the internal wall of the main skirt.

The hopper is directed so that it tapers to a discharge outlet in direction of the main skirt discharge end; then its tapered end, corresponding to the hopper discharge outlet, is near from the main skirt discharge end. According to the main embodiment of the present invention, the hopper is totally placed inside the main skirt volume. Consequently, the section of the hopper discharge outlet is either at most substantially in the same plane as the section of the discharge end of the main skirt or recessed inside the skirt volume. On account of the relative positioning of the hopper and the main skirt, a groove extends between the wall of the hopper and the wall of the main skirt along all the periphery of the hopper discharge outlet. To achieve this goal, it is understandable that the hopper is generally attached to the internal periphery of the main skirt through its more enlarged end.

The hopper can present any form. It usually presents a circular form but it can also presents a specific form similar to the inlet of the connection system; this specific form can avoid the refilling of the system with a product that is not adapted for. According to a preferred embodiment, the hopper has a frusto-conical shape. The advantage of a circular form for the hopper discharge outlet is that a container with such a port system can then be connected in whatever position to the connection system; no specific orientation of the container relative to the connection system is required.

The tapering angle of the hopper usually depends from the nature of the bulk material stored inside the container and especially from the flowability of this bulk material.

In a particular embodiment of the present invention, the hopper can comprise a bulk material guiding device coupled to the tapered end of the hopper. Said guiding device may be for example a cylinder. According to this embodiment the outlet of the guiding device forms the hopper discharge outlet in place of the hopper tapered end. Then, when this particular embodiment is implemented, the terms "hopper discharge outlet" mean the guiding device outlet. According to the invention, the whole of the hopper and its guiding device is in the volume of the main skirt and the guiding device outlet is closed by the tearable membrane.

The main skirt and the hopper of the port system are preferably made of one single piece of material. They can be made of plastic like high-density polyethylene or polypropylene.

Lastly the port system of the present invention comprises a tearable membrane that closes simultaneously the hopper and the main skirt discharge end. The tearable membrane closes the hopper inside the main skirt volume. The tearable membrane is in contact with the discharge outlet of the hopper. The tearable membrane aims at closing the container when the port system is placed on the container outlet but the container has not yet been connected to the connection system. The membrane is attached to the main skirt discharge end but not to the hopper discharge outlet. Then, when it is torn, the torn pieces of the membrane slide on the hopper discharge outlet and are pushed inside the groove between the hopper wall and the main skirt wall. Preferably, the membrane is tearable by contact pressure on its surface. Such a tearable function can be obtained by making small perforations through the membrane that would enable the tear of the membrane. Then the membrane can present tear lines. It has been proved that when tear lines are straight lines that intersect at the centre of the membrane then better opening of the membrane is obtained and better unloading of the bulk material is possible. Yet any other form of tear lines can be used. The membrane may be made of any material that is tearable, this can be at least a material chosen between: paper, aluminium, polymer sheets and combination thereof. It can be a laminate of sheets of these different materials. For example, the membrane can be composed of a sheet of polyethylene that provides strength to the membrane, said sheet comprising tear lines, and a sheet of aluminium that provides air tightness, the both sheets being stuck together. Such a membrane is fixed on the main skirt discharge end so that the sheet of aluminium faces the outside of the container. The composition of the membrane can vary according to the strength that is intended to be provided to tear the membrane; it can depend from the type of connection system to which the port system will be fastened and particularly to the force that will be applied to the container (according if it is a manual or mechanical force).

According to the preferred embodiment of the present invention, the discharge outlet section of the hopper can be substantially in the plane of the discharge end section of the main skirt. This common plane is usually perpendicular to the main axis of the hopper. According to this first mode, the tearable membrane simultaneously covers the discharge outlet of the hopper and the discharge end of the main skirt placed in the same plane. The membrane is placed in this specific plane common to the discharge end of the main skirt and the hopper discharge outlet.

Preferably, the main skirt discharge end presents a flange. The tearable membrane is preferably fixed on said flange.

According to another embodiment of the present invention, the edge of the discharge outlet of the hopper can be recessed inside the main skirt volume. The edge of the hopper discharge outlet is set back from the main skirt discharge opened end. In this second mode, the tearable membrane covers the edge of the discharge outlet of the hopper and is connected to the inner wall of the main skirt.

According to a specific mode, the main skirt connecting means for attachment to the outlet of the container can be present on a part of the internal periphery of the main skirt. In a first variant of this specific mode, the main skirt can present a first part comprising the connecting means for attachment to the outlet of the container and a second flared part near to its discharge end, and the hopper can be attached to the internal wall of the main skirt in the middle of the first and the second parts. In a second variant of this specific mode, the port system can comprise a second skirt attached to the main skirt discharge end, said second skirt presenting a smaller section than the main skirt section and presenting the same form as the container outlet so that said second skirt is able to fit inside the container outlet. The hopper is attached to the internal wall of the second skirt. The section corresponds to the section perpendicular to the central axis of the skirt. The port system of this second embodiment presents the advantage of being compact, the hopper being placed in the volume of the container outlet.

In a second aspect, the present invention relates to a container for bulk material comprising a vessel and an outlet closed by a port system such as described above.

According to an embodiment, the port system can be simply connected to the container outlet by sticking or welding or by the means of connecting means cooperating with correspondent connecting means on the container outlet, like snapping or screwing. Preferably, the container presents a neck on which the connection of the port system is easier.

According to another embodiment, the port system main skirt can be the neck of the container. The main skirt of the port system is the neck of the container. In this embodiment, the port system main skirt, the port system hopper and the container are parts of the same single device, whereas the tearable membrane—that is made of a different material—is fixed on this device. Such a container can be produced by moulding, it is then filled with the bulk material and finally the membrane is fixed on the port system of the container.

The port system of the present invention is particularly adapted to close a container comprising a bulk material. Said bulk material can be either under the form of particles like granulates, granules, grains, powders and the like or under the form of a liquid, a paste or a gel The container holds the bulk material in a closed manner in order to store, transport and deliver this bulk material to a connection system. The port system allows firstly a safe storage of the bulk material inside the container when it has not yet been used. To improve the storage, the container may comprise a protection cap above the tearable membrane of the port system. This cap enables the protection of the tearable membrane during the transport of the container. This cap can be a peelable cover. According to another embodiment, the entire container can be packed in a closed package until it is used, particularly when very sensitive product like milk powder are used or when the membrane is not totally air tight like a paper membrane.

According to the preferred embodiment of the present invention, the container is filled with coffee powder. Yet, this type of container may be used for the storing and unloading of any other bulk material either in food or non food area, especially material that are sensible to the air and must be transferred from the container to another recipient with limited contact with the air. Food material may be any food concentrate intended to reconstitute a hot or cold, frothy or non-frothy drink. For example, the bulk material may be a powder of soluble milk, coffee, cocoa, tea or a combination thereof. Other powdered foods such as dried mashed potatoes or other dried foods, sauce or gravy powders, soup powders or the like may also be used in this invention. The container of the present invention can also store pharmaceutical compounds or chemical compounds that must be fed in machines with limited contact with air and in a rapid way. Such machines can be packaging machines or process machines.

Generally the container is prepared by filling the bulk material inside and then by connecting the port system to the outlet of the container by the means of the corresponding connecting means between the container outlet and the port system. The connecting means can be irreversible connecting means like welding or sticking.

Once the container of the present invention is used, the protection membrane is pierced to unload the bulk material and the container can no more be used. The container is disposed when it is empty. For this reason, it can advantageously made of a compressible material like PET.

The container of the present invention presents numerous advantages. Due to the fact that the functionalities of the container (the hopper and its position relative to the vessel) are hired inside the vessel, it is possible to choose any shape for the vessel, particularly shapes enabling easy manufacturing and easy storing and easy handling. For the same reason, the container is solid since no component extends out of the vessel and can be broken through manipulation. Another advantage of the container of the present invention is that it simultaneously enables the storage of a big quantity of bulk ingredient and the rapid emptying of this container through the hopper to the connection system. The hopper reduces time for exhausting the material while protecting the material during its transfer.

Any shape of vessel could be used. The section of the vessel can be circular, oval, square, elliptical or the like. The form and the size of the section can vary along the length of the vessel to provide a better handling of the container, for providing a marketing appeal or for tight fitting inside dispensers. The vessel can be made of at least a material chosen between: plastic, cardboard paper, aluminium or a combination and/or laminate of such materials. According to a specific embodiment, a part of the vessel can be a flexible pouch. The materials should present a good humidity barrier and, optionally, good oxygen barrier. Depending on the nature of the bulk material that is intended to be stored inside, these materials can also present UV rays- and light-barrier properties. In a special a part of the vessel can be at least partially transparent by using for example a transparent plastic. Such a transparent end enables the control of the level of the remaining bulk material inside the container when this one is used. This transparent part of the vessel can also be placed near the opened end of the vessel with the same purpose.

In a third aspect, the present invention concerns a machine susceptible to be refilled by a container as described above, said machine presenting a connection system comprising means for piercing the tearable membrane of the port system and for cooperating with the hopper of the port system. The means for piercing the tearable membrane and for cooperating with the hopper of the port system are preferably a conduit presenting a section smaller than the section of the discharge end of the port system and bigger than the section of the hopper discharge outlet. The inlet section of the conduit presents generally a symmetrical form preferably a circular form. It can present a specific form cooperating exactly with the discharge outlet of the hopper to avoid the refilling of the tank with a material that is not adapted for. Due to these relative section differences:
   the conduit of the machine can fit into the main skirt discharge end when piercing the membrane, and
   the discharge outlet of the hopper can fit into the conduit of the machine to be refilled, which enables the bulk material to flow from the container to the machine.

In a fourth aspect, the present invention concerns a method for fastening a container as described above to a machine presenting a connection system comprising means for piercing the tearable membrane of the port system and for cooperating with the hopper of the port system, said method comprising the steps of:
   positioning the container and the connection system so that the port system tearable membrane faces the means for piercing the tearable membrane of the container and for cooperating with the hopper of the port system,
   pushing the container against said means in order to break the port system tearable membrane.

In the first step of the method, the membrane faces the means for piercing it. Usually the container is placed upside down which means that the port system of the container with the membrane is the bottom of the container: the bulk material is gravity oriented to the hopper and the discharge outlet of the hopper inside the container. The membrane retains the bulk m material inside the container. And in a second step, the operator pushes the container against the means for piercing the tearable membrane. If the container is placed upside down as described above, then the bulk material flows immediately from the container through the pierced membrane inside the machine. Thus, the user can easily perform the filling operation of the machine by hand in a simple movement by turning the container upside down and pushing it against the machine. Consequently it is possible in a single movement to simultaneously open the container and to empty the bulk material, which is much appreciated by operators and users.

The machine can comprise a lever able to cooperate with the vessel of the container. In the second step, the lever can be leant on the vessel to push the container.

If the bulk material flows in a machine tank of which volume is at least equal to the volume of the container, then all the bulk material flows inside the tank and when it is empty, the container is disposed.

If the bulk material flows in a machine tank of which volume is inferior to the volume of the container, which is often the case for beverage dispensers, then the container can stay in place above the machine and be used as the dispenser tank in a following step.

In a fifth aspect, the invention relates to a system for preparing beverages by mixing of a flowable beverage concentrate with a diluent comprising:
   a container as described above for storing the flowable beverage concentrate,
   a machine comprising:
      a dosing unit comprising dosing means,
      diluent feeding means,
      means for mixing a dose of flowable beverage concentrate and the diluent.

a connection system comprising means for piercing the tearable membrane of the port system and for cooperating with the hopper of the port system.

Lastly, the invention relates to a system comprising:
a container as described above for storing the bulk material and filling the machine,
a machine for processing a bulk material comprising:
a dosing unit comprising dosing means,
means for processing a dose of bulk material,
a connection system comprising means for piercing the tearable membrane of the port system and for cooperating with the hopper of the port system Effectively the container for storing the bulk material as described above may be used for the storing and unloading of any other bulk material than a beverage powder either in food or non food area. The container can store pharmaceutical compounds or chemical compounds that must be fed in a machine tank with limited contact with air and in a rapid way. Such machines can be packaging machines or process machines comprising a tank of bulk material, dosing means for taking and eventually metering the bulk material and leading it to means for processing it.

The objects of the present invention present several advantages. The containers according of the present invention enable the refilling of dispensers tanks without loss of bulk material outside the tanks. Besides the containers avoid the contact of the bulk material with the atmosphere during bulk material transfer which can be of paramount importance for a material like coffee powder (to avoid its loss of aroma) or for hygroscopic powder. The containers of the present invention enable the refilling of dispensers tanks that present means for cooperating with said container then avoiding wrong refilling of a machine tuned to prepare beverages with a specific powder.

BRIEF DESCRIPTION OF THE DRAWINGS

The characteristics and advantages of the invention will be better understood in relation to the figures which follow.

DETAILED DESCRIPTION OF THE DRAWINGS

Figure 1:
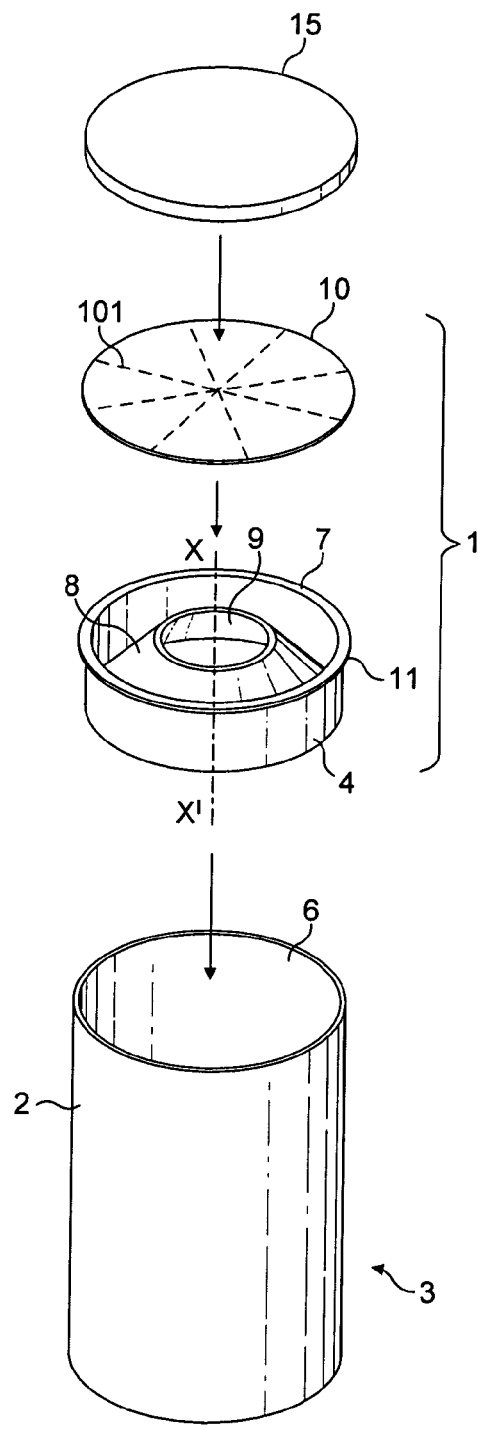
FIG. 1 is an exploded view of a container with a port system according to the invention.

FIG. 1 concerns a container closed by a port system according to the present invention and illustrates the relative positioning of the container 3, the port system 1 and a cap 15. The container is made of a vessel 2 presenting an outlet 6. The port system 1 of the present invention to be fitted in the outlet of the container comprises a main skirt 4. This main skirt 4 is connectable to the container outlet as it presents the same circular form as the container outlet. The connection can be improved by sticking the main skirt the inside wall of the container outlet. The main skirt 4 presents a discharge end 7 from where the material stored in the vessel 2 is evacuated. The port system 1 comprises a hopper 8 attached to the main skirt 4 through its larger end and tapering to a discharge outlet 9 in direction of the main skirt discharge end 7. The section of the hopper discharge outlet 9 and the section of the main skirt discharge end 7 are in the same plane (these sections correspond to perpendicular sections to the axis XX' of the hopper). The positioning of the hopper and the main skirt creates a groove between their respective walls. The discharge end 7 of the main skirt presents a flange 11 on which is fixed the tearable membrane 10. Since the sections of the hopper discharge outlet 9 and of the main skirt discharge end 7 are in the same plane, the fact of fixing the membrane on the main skirt discharge end 7 simultaneously enables the closure of the hopper by the membrane 10. The membrane 10 is tearable due to the presence of tear lines through its material. FIG. 1 illustrates the preferred design of the tear lines that is straight lines 101 intersecting at the centre of the membrane. Preferably, the tearable membrane 10 comprises at least three straight lines. A cap 15 is placed on the port system 1 to protect the membrane during storage and/or handling.

Figure 2A:
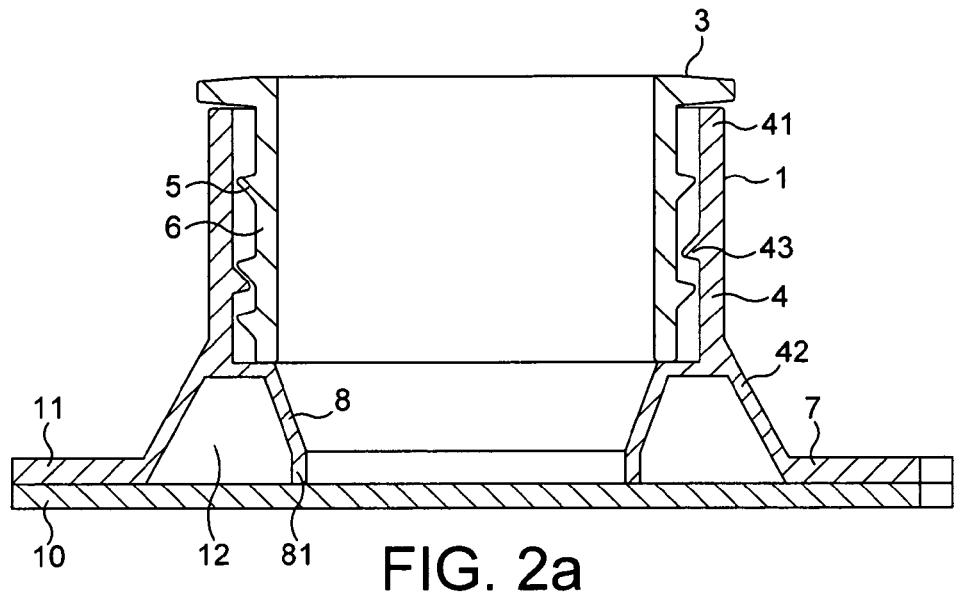
FIG. 2a is a sectional view of the port system according of the first preferred embodiment of the invention, said port system closing a container neck.

FIG. 2a illustrates a system port according to the present invention. This port system is connected to a container 3 comprising a vessel (illustrated on FIG. 4) and an outlet 6 in the form of a neck.

Figure 4:
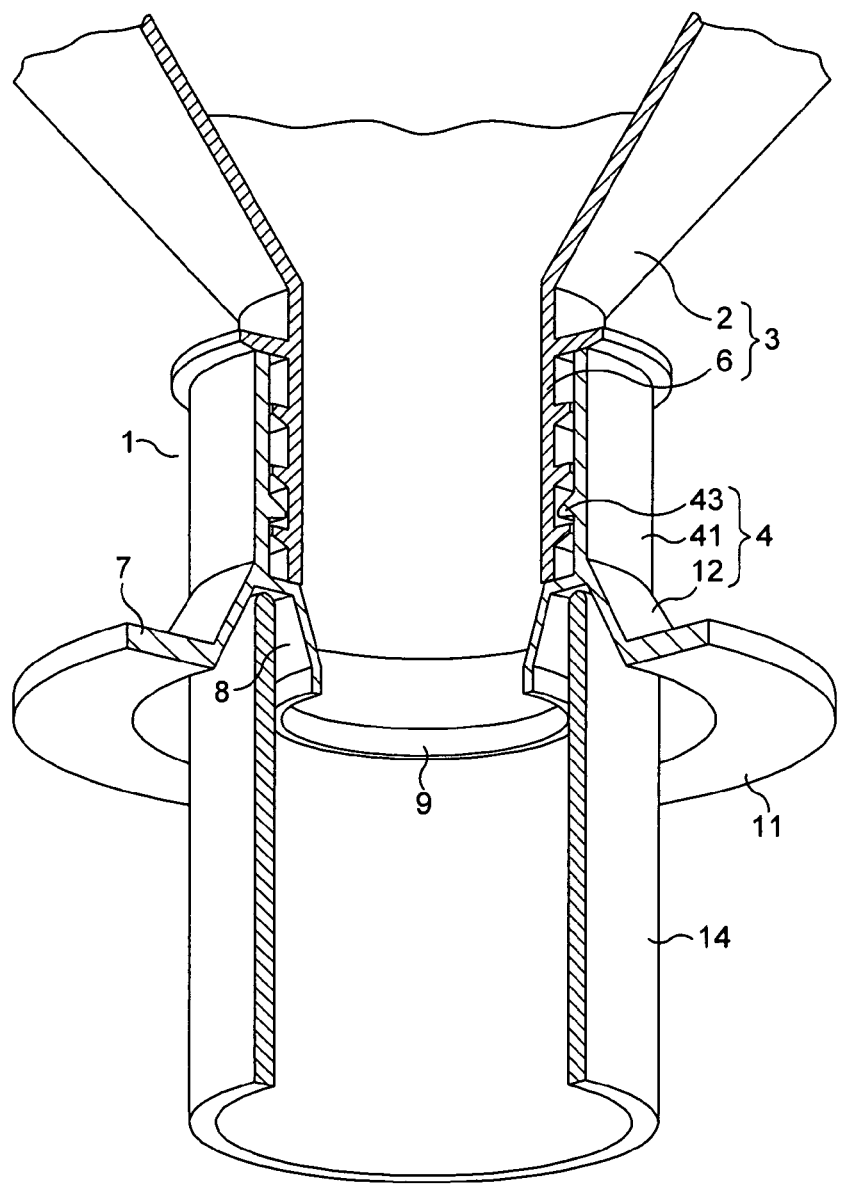
FIG. 4 is a perspective view of FIG. 2b.

According to FIG. 4, the vessel is a rigid vessel, but it can also be a flexible pouch enabling the storage of a big amount of bulk material inside the container. This type of flexible pouch is especially adapted for storing and dispensing soluble food powders for the preparation of beverages in beverage dispensers. When this type of flexible pouch is placed in a beverage dispenser, the flexible part is hooked in the dispenser whereas the port system is used for the connection to beverage preparation side part of the machine.

As illustrated in FIG. 2a, the port system 1 comprises a main skirt 4 presenting an annular form. The main skirt comprises two parts: a first part 41 is a ring presenting on its inside wall connecting means 43 for attachment to the corresponding connecting means 5 of the container outlet 6. These connecting means are screwing means but any other type of connection can be used. The main skirt 4 comprises a second part 42 that is a flared compared to the first part in direction of the port system discharge end 7. The discharge end 7 of the main skirt presents a flange 11 around all the periphery of the discharge end. The port system comprises a hopper 8 of which larger end is connected to the main skirt in the middle of the first and the second parts 41, 42 and that tapers to a discharge outlet 9. The size and the position of the hopper 8 are determined so that the hopper is placed inside the port system volume and so that the section of the hopper discharge outlet 9 and the section of the main skirt discharge end 7 are substantially in the same plane. Due to the fact that the hopper 8 tapers in direction of the discharge end 7 of the port system, a groove 12 exists between the hopper wall and the main skirt wall all around the periphery of the hopper discharge outlet 9. Lastly the port system comprises a tearable membrane 10 attached to the flange 11 of the main skirt closing simultaneously the main skirt discharge end 7 and the hopper discharge outlet 9 that are both in the same plane. Generally, the section of the hopper, the section of the main skirt discharge end and the depth of the groove are defined in order that the pieces of torn membrane can be sufficiently pushed inside the groove and in order to free the hopper discharge outlet.

It can be noticed that the hopper 8 of FIG. 2a presents a small guiding device 81, here a cylinder, coupled to the tapered end of the hopper. The hopper with its guiding device is totally placed inside the main skirt volume and positioned so that the outlet of the guiding device, corresponding to the hopper discharge outlet, is closed by the tearable membrane 10. The membrane closes simultaneously the main skirt discharge end. Due to the membrane, the material is safely stored in the container.

Figure 2B:
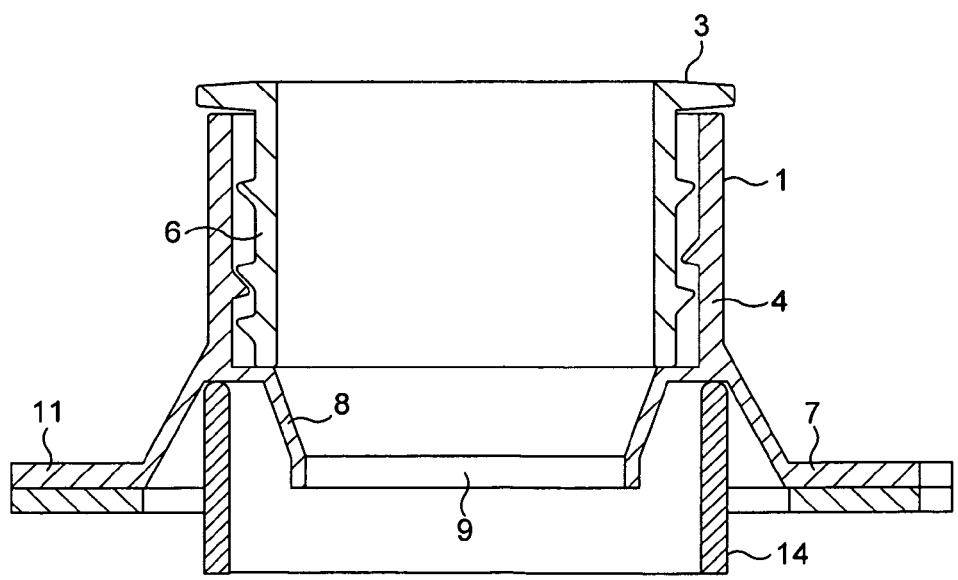
FIG. 2b is a sectional view of the port system of FIG. 2a in connection position with a connection system.

FIGS. 2b and 4 illustrate the state where the container of FIG. 2a with the port system is fastened to a connection system, here in the form of a conduit 14. The container with the port system is placed so that the membrane 10 faces the conduit 14. Due to the presence of the groove just under the membrane, the membrane can be torn by the connection system and the hopper can simultaneously slide inside said connection system. The contact with air is reduced. Before the membrane is torn, the bulk material inside the container faces the discharge outlet 9 of the hopper and is retained by the tearable membrane 10. The conduit 14 of the connection system 9 presents a section that is greater than the section of the hopper discharge outlet and smaller than the main skirt discharge end, then the conduit edge can slide inside the groove of the port system. By exercising a pressure of the port system against the conduit, the membrane 10 breaks, the conduit 14 enters the port system 1 of the container 3 inside the peripheral groove 13 existing between the hopper tapering wall and the main skirt wall and cooperates with the hopper 8. On account of this groove extending all along the periphery of the hopper discharge outlet, the cooperation of the hopper 8 and the conduit 14 is very tight. Then the bulk material directly flows from the vessel 2 into the tank without possibility to escape in the air or to let air enters the space between the container and the connection system.

Figure 3A:
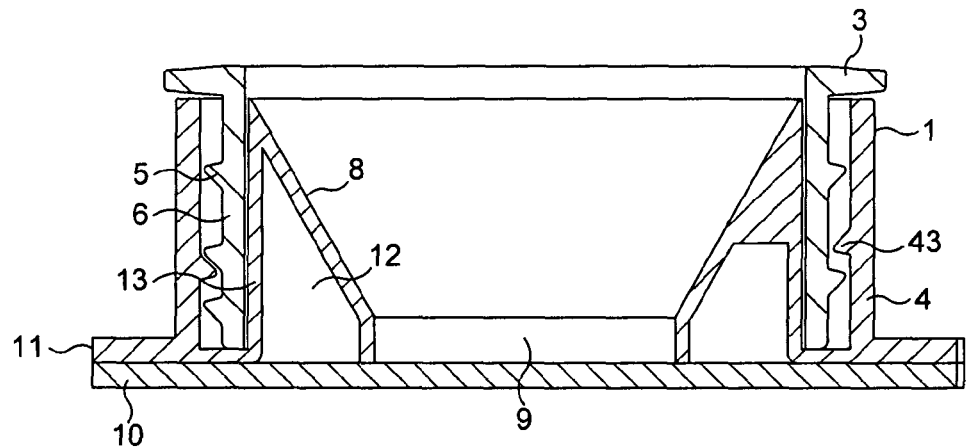
FIG. 3a is a sectional view of the port system according of the second preferred embodiment of the invention, said port system closing a container neck.

In FIG. 3a, the port system 1 comprises a main skirt 4 presenting an annular form. The main skirt comprises on its inside wall connecting means 43 for attachment to the corresponding connecting means 5 of the container outlet 6. These connecting means are screwing means but any other type of connection can be used. The discharge end 7 of the main skirt presents a flange 11 around all the periphery of the discharge end. The port system comprises a second skirt 13 attached to the main skirt discharge end 7. Said second skirt presents a smaller section than the main skirt and has the same form as the container outlet 6 so that it is in contact with the container outlet inside wall when the port system 1 is connected to the container outlet. The hopper 8 is attached to the second skirt 13. The hopper tapers to a discharge outlet 9. The size and the position of the hopper 8 are determined so that the hopper is placed inside the port system volume and that the hopper discharge outlet 9 section is substantially in the same plane as the section of the main skirt discharge outlet 7. Due to the fact that the hopper 8 tapers in direction of the discharge end 7 of the port system, a groove 12 exists between the hopper wall and the second skirt wall all around the periphery of the hopper discharge outlet 9. Lastly the port system comprises a tearable membrane 10 attached to the flange 11 of the main skirt closing simultaneously the main skirt discharge end 7 and the hopper discharge outlet 9 that are in the same plane.

Figure 3B:
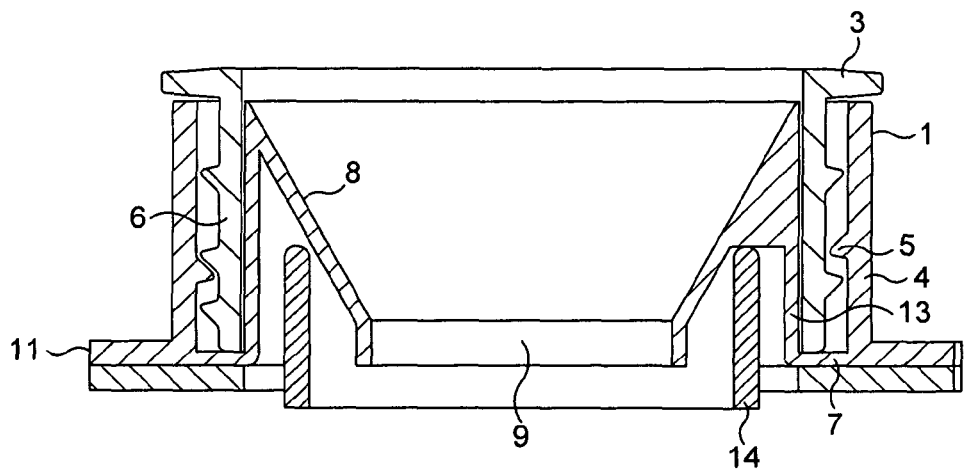
FIG. 3b is a sectional view of the port system of FIG. 3a in connection position with a connection system.

FIG. 3b illustrates the state where the container of FIG. 3a with the port system is fastened to a connection system, here in the form of a conduit 14. The container with the port system is placed upside down above the conduit 14. As in FIG. 2b, due to the presence of the groove just under the membrane, the membrane can be torn by the connection system and the hopper can simultaneously slide inside said connection system.

As apparent from FIG. 4, the selection of the form and the size of the hopper 8, and then of its discharge outlet 9, and the selection of the form and the size of the conduit 14 of the connection system avoids the wrong refilling of the connection system with a bulk material that is not adapted for.

The invention claimed is:

1. Port system for fastening a container comprising a vessel and an outlet to a connection system having an inlet, the port system comprising:
   a main skirt that can be connected to the outlet of the container comprising a connecting end, a discharge end and connecting means for attachment to the outlet of the container, the connecting means for attachment to the outlet of the container being on a part of the internal periphery of the main skirt, the main skirt comprising a first part comprising the connecting means for attachment to the outlet of the container and a second flared part near to the discharge end;
   a hopper attached to an internal wall of the skirt and tapering to a discharge outlet in a direction of the main skirt discharge end, the hopper being attached to the internal wall of the main skirt in the middle of the first and the second parts of the main skirt; and
   a tearable membrane closing the skirt discharge end and the hopper.

2. Port system according to claim 1 wherein a groove extends between a wall of the hopper and the wall of the main skirt along an entirety of the periphery of the hopper discharge outlet.

3. Port system according to claim 1 wherein the discharge outlet of the hopper is substantially in the same plane as the main skirt discharge end.

4. Port system according to claim 1 wherein the main skirt discharge end comprises a flange.

5. Port system according to claim 4 wherein the tearable membrane is fixed on the flange of the main skirt.

6. Port system according to claim 1 wherein the tearable membrane is tearable by a contact pressure on its surface.

7. Port system for fastening a container comprising a vessel and an outlet to a connection system having an inlet, the port system comprising:
   a main skirt that can be connected to the outlet of the container comprising a connecting end, a discharge end and connecting means for attachment to the outlet of the container, the connecting means being on a part of the internal periphery of the main skirt;
   a second skirt attached to the main skirt discharge end, the second skirt comprising a smaller section than the main skirt section and comprising the same form as the container outlet so that said second skirt is able to fit inside the container outlet;
   a hopper attached to an internal wall of the skirt and tapering to a discharge outlet in a direction of the main skirt discharge end, the hopper being attached to the second skirt; and
   a tearable membrane closing the main skirt discharge end and the hopper.

* * * * *